United States Patent [19]

Collette

[11] Patent Number: 5,081,529
[45] Date of Patent: Jan. 14, 1992

[54] COLOR AND TONE SCALE CALIBRATION SYSTEM FOR A PRINTER USING ELECTRONICALLY-GENERATED INPUT IMAGES

[75] Inventor: Robert P. Collette, Pavilion, N.Y.

[73] Assignee: Eastman Kodak Company, Rochester, N.Y.

[21] Appl. No.: 629,516

[22] Filed: Dec. 18, 1990

[51] Int. Cl.$^5$ .............................................. H04N 1/46
[52] U.S. Cl. ........................................ 358/80; 358/76; 382/17
[58] Field of Search ....................... 358/76, 80; 382/17

[56] References Cited

U.S. PATENT DOCUMENTS

| | | | |
|---|---|---|---|
| 3,972,066 | 7/1976 | Seki et al. | 358/76 |
| 4,573,071 | 2/1986 | Sakamoto | 358/76 |
| 4,598,282 | 7/1986 | Pugsley | 340/703 |
| 4,710,785 | 12/1987 | Mills | 346/153 |
| 4,736,245 | 4/1988 | Seto et al. | 358/76 |
| 4,779,106 | 10/1988 | Mills | 346/154 |
| 4,802,007 | 1/1989 | van der Brug | 358/139 |
| 4,812,879 | 3/1989 | Suzuki | 355/38 |
| 4,857,994 | 8/1989 | Belmares-Sarabia et al. | 358/22 |
| 4,979,032 | 12/1990 | Alessi et al. | 358/76 |

Primary Examiner—Leo H. Boudreau
Assistant Examiner—Steven P. Klocinski
Attorney, Agent, or Firm—David M. Woods

[57] ABSTRACT

A calibration system for electronically-generated images includes a calibration utility 22 for modifying tone scale and/or color reproduction so that a reproduced print 10 will faithfully match a monitor image 16. An input memory 19 provides a stored image for processing by application software 20 until an acceptable monitor image 16 is obtained. If a hard copy print 20 made from the processed image does not match the monitor image 16, a printer tone scale algorithm 28 and a printer color algorithm 30 in the calibration utility 22 are invoked to match the print to the monitor. An operator adjusts tone scale controls 32 and color controls 34, which provide values for calibrating a tone scale look-up table 49 and a color matrix 48 in a printer 14. Interactive feedback is provided by inversely modifying a tone scale look-up table 44 and a color matrix 46 used in processsing the display signal. When the monitor image 16 looks "as bad as" the print, the calibration of the printer 14 is completed and the monitor 18 reverts to its original state.

15 Claims, 4 Drawing Sheets

COLOR AND TONE SCALE CALIBRATION SYSTEM FOR A PRINTER USING ELECTRONICALLY-GENERATED INPUT IMAGES

BACKGROUND OF THE INVENTION

1. Field of the Invention

This invention pertains to the calibration of an electronic output system for use with a color printer so that the final print obtained looks like an image obtained on a video monitor.

2. Background Art

It is a common objective of a printing system to obtain a satisfactory match between an output print and an image produced of the print on a monitor. Commercially available graphic systems (e.g., such as the Designmaster 8000 electronic prepress system, manufactured by Eikonix Corporation) employ calibration tools that allow an operator to compare and match color proofs with a color monitor display. The procedure begins by selecting a representative sample of pictures. The pictures are scanned into the machine and optimal color separations are generated for each of the pictures. Optimal color proofs are then made up from the color separations and compared to the scanned image on the color monitor. If a match is not immediately evident, the color monitor is adjusted by creating monitor/proof ink tables that are modifications of the calibrated ink tables provided with the equipment. Ultimately, the modified tables will produce a monitor display that most closely matches the variety of pictures that will be viewed over the course of production. In this way, the operator is assured that a printed copy will match editorial changes seen on the monitor display.

The same basic methodology has been used in photographic printing systems. For example, in U.S. Pat. No. 4,736,245, a photographic printing inspection system includes a preprocessing step in which a reference photographic negative (including a grey scale) is repeatedly printed until an optimal print is obtained. Then the original grey scale is scanned and displayed on a display monitor, and gradation tables in the display system are corrected until the video grey scale is identical to the grey scale included with the optimal print. With the monitor thus calibrated, the images on the monitor will accurately correspond to photographs subsequently produced by a color printer. As with the ink printing systems, the monitor is matched to an optimal hard copy, ending up with a monitor image that looks like the final output.

In many video or computer printing situations, however, the input is generated electronically. There is no optimal, real input image to compare to the monitor. Consequently, it becomes difficult to calibrate the monitor to look like a final print. Heretofore, as disclosed in U.S. Pat. Nos. 4,779,106 and 4,710,885, it has been the practice with such systems to form a printout of a stored video image, scan the printout into a processor, and then electronically compare the scanned data with the stored data to determine difference data which can be used to modify subsequent images. This is a technically complex procedure wherein the comparison is made electronically, rather than interactively by an operator, as in the ink and photographic systems.

SUMMARY OF THE INVENTION

Instead of calibrating the monitor to match an "ideal" hard copy output, considerable savings in time and effort can be obtained, especially in an electronic environment, by instead calibrating the "hard copy", i.e., the printer, to match the monitor. In doing this, the electronic input system is first set up to produce a desired image on the monitor, in both tone scale and color. Then a sample color proof is made. The proof will ordinarily not match the monitor, i.e., the proof will have incorrect tone scale and/or color. The calibration process is then initiated by adjusting the monitor for tone scale and/or color until the monitor image looks the same as the proof, i.e., "as bad as" the proof. The inverse of these corrections are then entered into the printer, which now is calibrated to produce a print that will match the monitor image. The monitor, meanwhile, reverts to its original color and tone scale settings, i.e., before the calibration process was initiated, and now faithfully matches the hard copy (corrected) output of the printer. In the preferred embodiment, the tone scale and color algorithms provide direct adjustments to the printer tone scale look up table and color matrix, and substantially inverse adjustments are applied to the monitor to effect changes in the monitor image.

Consequently, the calibration system according to the invention calibrates an electronic output system of a color printer so that a print generated by the printer closely resembles an image of the print obtained on a video monitor. The system includes printer calibration means for adjusting at least one of the tone scale and the color reproduction of the printer, and display calibration means for adjusting at least one of the tone scale and the color reproduction of the monitor. The printer and display calibration means are commonly controlled by means interactive with an operator, whereby the adjustment of the monitor is substantially the inverse of the adjustment of the

BRIEF DESCRIPTION OF THE DRAWINGS

The invention will be described in relation to the drawings, in which.

DESCRIPTION OF A PREFERRED EMBODIMENT

Figure 1:
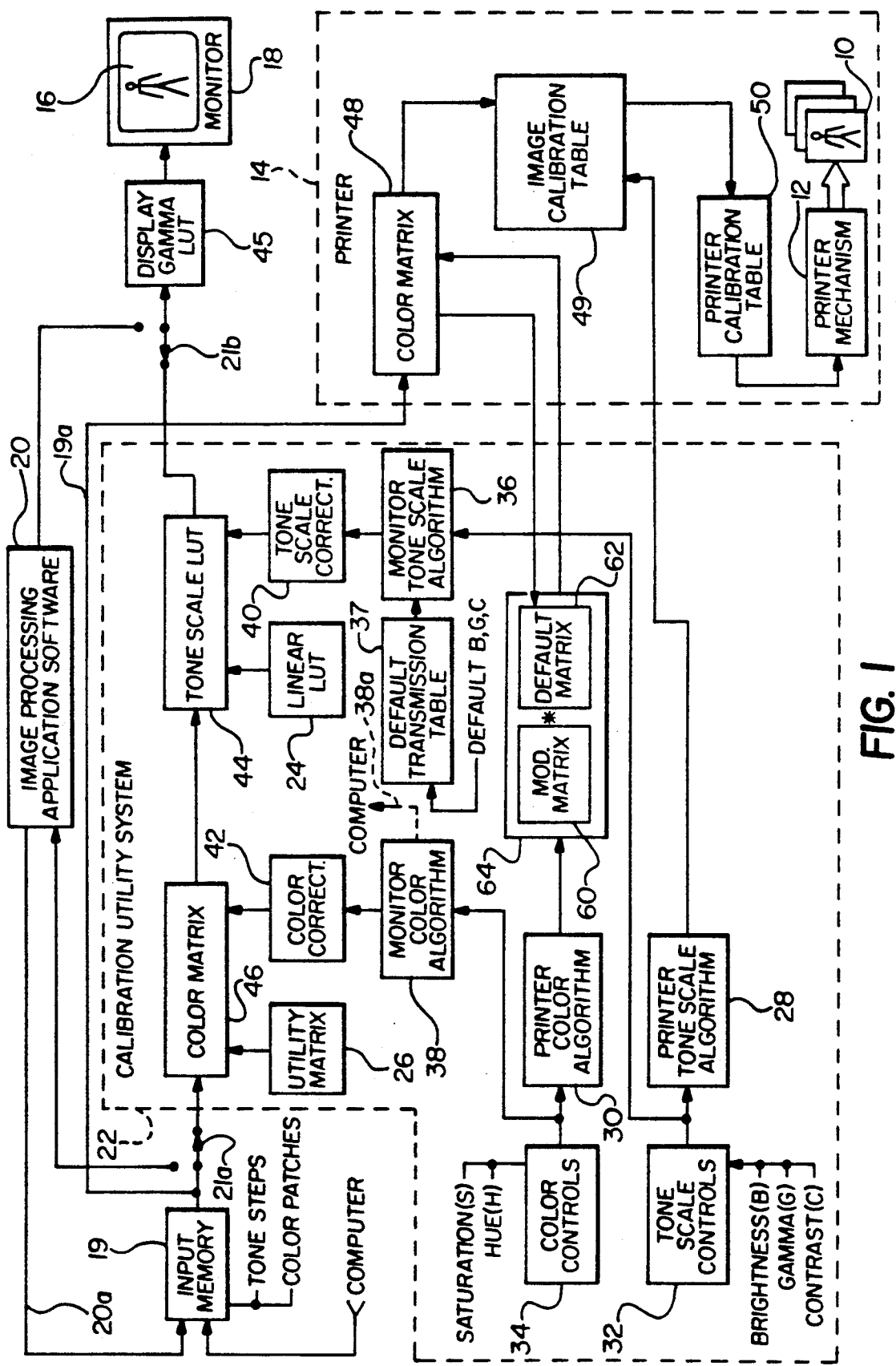
FIG. 1 is a block diagram of a printer using electronically-originated images and a calibration system in accordance with the invention.

Referring first to FIG. 1, a printing system using electronically-generated image input is shown with a calibration utility for matching a print 10, produced by a printing mechanism 12 of a printer 14, with a cathode-ray tube (CRT) display 16 on a CRT monitor 18. (While not essential for practice of the invention, the preferred calibration utility matches a thermally-produced print, generated by the thermal printing mechanism of a color printer, with the monitor display. More specifically, the utility is designed for the Model XL7700 color printer, manufactured by the Eastman Kodak Co., Rochester, N.Y. Other printers, however, may be readily used with suitable changes in the utility algorithms.)

Both the print 10 and the display 16 result from digital image data (code values) provided from an input memory 19. The image itself originates from, e.g., internal computer graphics, a scanned image source, a television signal, or the like. The image data is conventionally processed in an image processing application software package 20, such as Photoshop (which is sold by the Adobe Corp.) or Color Studio (which is sold by the Letraset Corp.), until a desirable image appears on the monitor 18. During this procedure the switches 21a and 21b are set accordingly to provide a signal path from the memory 19 through the application software 20 to the monitor 18. The suitably processed image is then returned on a line 20a for storage in the input memory 19. Additionally, the stored image data is applied to the printer 14 on a line 19a and a print is made by the printer 14. (The switches 21a and 21b, as well as the various lines interconnecting the switches and the application software 20 and the input memory 19, are shown for ease of illustration and discussion. Typically, the switching function is accomplished by software, which allows selection between the calibration utility and the application software 20.)

While it is possible to obtain a reasonable match between the print 10 and the monitor image 16 at this point, it is very difficult to obtain a highly satisfactory match for a variety of reasons. One reason is that different processes are used to produce color in the two systems. A CRT monitor uses an additive color process, in which mixtures of red, green, and blue light from color phosphors are added together to produce a variety of colors. On the other hand, a color print utilizes a subtractive color process, whereby ambient light passes through layers of color dyes and reflects from the white paper base of the print back through the color dye layers. Color is produced by subtracting portions of the color spectrum from the light striking the surface of the print. Furthermore, a CRT display and a color print each have a different color gamut, which is the range of colors (hue, saturation, and brightness) that can be produced by a specific set of primary colors. Generally, CRT phosphors possess a wider color gamut than do photographic printing dyes, particularly in the blue and green regions. However, there are some colors that can be printed that cannot be displayed on a typical CRT display.

There are two main factors that affect the appearance of a color print in relation to a display on a CRT monitor: tone reproduction and color reproduction. Tone reproduction or tone scale matching, as it is sometimes called, is the ability to match the luminance or brightness variations of the print to that of the monitor. For example, a black-and-white image having proper tone reproduction would have the dark (shadow) areas be nearly black, the white (highlight) areas be nearly white, and the greys (mid-tones) be the proper middle lightnesses, all without losing subtle detail in the shadow and highlight areas. Color reproduction or color matching, as it sometimes called, is the ability to match the hue and saturation of a print color to that of the monitor. Hue and saturation, in conjunction with the luminance or brightness, help describe the perceived color. For example, hue is the property that distinguishes between a red object and a yellow object, while saturation is the property that distinguishes between a red object and a pink object. Pink has the same hue as does red, however it is much less saturated.

In accordance with the invention, a calibration utility system 22 provides an interactive ability to obtain a satisfactory match between the print 10 and the CRT image 16 on the CRT monitor 18, in particular providing real-time, operator-interactive feedback as to the magnitude of each change made to the image. A printer tone scale algorithm 28 and a color algorithm 30 are accordingly provided within the calibration utility 22 for generating corrections that provide matched images. Since it is helpful to initially view the input image only as processed by the application software 20, a default tone scale table 24 and a default color matrix 26 are contained within the image calibration utility 22 to provide a linear tone scale conversion and a unity color matrix, respectively, for initially recreating the input image without additional change. Corrections are then effected by a set of tone scale controls 32 and a set of color controls 34.

The tone scale controls 32 are operator-controlled adjustments for changing certain tone-related variables, including brightness (B), gamma (G), and contrast (C), of the input image. Similarly, the color controls 34 are operator-controlled adjustments for changing certain color-related variables, including the saturation (S) and hue (H), of the input image. As the operator changes these variables, the algorithms 28 and 30 accordingly calculate new correction terms that are sent to the printer 14. The same changes to the variables B, G, C, S, and H are applied to a monitor tone scale algorithm 36 and a monitor color matrix algorithm 38, which calculate new correction terms for reproducing the input image on the monitor 18. In accordance with the preferred embodiment, the monitor color matrix algorithm 38 directly uses the hue (H) and saturation (S) changes from the color controls 34 in its monitor color calculations, while the monitor tone scale algorithm 36 directly uses the brightness (B), gamma (G) and contrast (C) changes from the tone scale controls 32 in its monitor tone scale calculations. The tone scale monitor corrections are saved in a tone scale correction table 40 and the color matrix monitor corrections are saved in a correction matrix 42. In both cases, the monitor corrections are substantially the inverse of the corrections applied to the printer 14. Albeit their outcomes are inverted, the printer tone scale algorithm 28 and the monitor tone scale algorithm 36, as well as the printer color algorithm 30 and the monitor color algorithm 38, are substantially complementary in that incremental changes in the tone scale and color of the monitor image 16 produce like (but opposite) changes in the tone scale and color of the printed image 10.

In order to process the input image for display, the calibration utility 22 includes a tone scale look up table (LUT) 44 and a color matrix 46. The tone scale LUT 44 selects either the default linear terms in the table 24 or the tone scale corrections in the table 40, while the color matrix 46 selects either the default unity matrix 26 or the terms in the correction matrix 42. When the calibration utility 22 is first connected into the signal path by appropriate setting of the switches 21a and 21b, the linear tone scale table 24 and the unity matrix 26 are automatically accessed by the tone scale LUT 44 and color matrix 46, respectively, in order to initially reproduce the image just as it was processed by the image processing application software 20. Then, as the operator changes the input variables by means of the tone scale controls 32 and the color controls 34, the tone scale corrections in the table 40 and the color matrix terms in the memory 42 are substituted for the linear tone scale (default) table 24 and the terms (default) in the unity matrix 26. The modified display signals from the calibration utility 22 are applied to a display gamma look up table 45, which adjusts the signals for the gamma transfer characteristics of the CRT monitor 18. Gamma correction is a non-linearity possessing generally the opposite shape as the CRT gamma, and is purposely introduced in an attempt to partially cancel the effects of the CRT gamma. The display LUT 45 (and its included D/A converter) takes the digital code values that make up the image data and converts them into voltages that are fed to the monitor 18. The gamma-corrected signals then form the CRT image 16 on the CRT monitor 18.

Tone reproduction and color reproduction are corrected in the printer 14 by processing the input image from the memory 19 through a color matrix 48, an image calibration look up table 49, and a printer calibration look up table 50. Considering tone reproduction first, the printer calibration table 50 serves several, relatively permanent tone-related functions. First, it compensates for the non-linearities of the printing process (thermal, in this case) to make the printer 14 behave in a linear, predictable way. Secondly, it ensures that the print 10 has the correct neutral balance. That is, the black, gray, and white areas of the print 10 appear neutral, without any coloration to them. Thirdly, it provides a way of recalibrating the printer 14 to handle different types of media. For example, different calibration tables 50 may exist for each of several different print/media modes (e.g., color/B&W, reflection print/transparency, high/medium/low density transparency). In the preferred embodiment, the printer calibration table 50 operates the printer 14 in density space. That is, the input code values (image data) from the input memory 19 are expected to be a function of density values, density being a logarithmic measure of the amount of light that is absorbed by the dyes in the print 10. As will be shown, however, the input code values are frequently not in density space, and therefore require further adjustment.

In addition to the printer calibration table 50, the printer 14 contains the adjustable image calibration table 49. The purpose of the image calibration table 49 is to match the tone reproduction of the print 10 to that of the image source in the input memory 19. For example, if the printer is given a fully-corrected image that exists in density space, then a straight-line image calibration would give the optimum results, since the printer calibration table 50 has already calibrated the printer to operate in density space. Most image data that is sent to the printer 14 exists in transmission (intensity) space, not density space. That happens because most electronic images are generated for viewing on a CRT monitor (such as the monitor 18), which operates with transmission values. Because of the logarithmic relationship between density (D) and transmission (T) values, i.e., $D = Log(1/T)$, the optimum image calibration for normal images will have an exponential shape rather than a straight line shape. Therefore, the image calibration table 49 is typically a non-linear function that accounts for an image that is not in density space and that is reproduced in relation to certain default assumptions concerning brightness (B), gamma (G), and contrast (C). More importantly, for purposes of the present invention, the image calibration table 49 also contains operator-supplied variations from the defaults, that is, tone scale corrections generated by the algorithm 28 in the calibration utility 22. In operation, the printer calibration table 50 and the image calibration table 49 will generate look up values that provide tone scale correction of the input image.

Turning next to color reproduction, it is first noted that a significant portion of "color matching" is accomplished by having matching tone reproduction. If the tone reproduction is correct and the color is within the color gamut of both printer 14 and monitor 18, then the color match between the print 10 and the display 16 should be acceptable. Apart from tone reproduction, there are several other variables that can affect the perceived degree of color matching. The first factor is the monitor color temperature or white point. Broadcast television monitors are usually adjusted to approximately 6500 degrees K, which is very close to being perceived as neutral or white by most observers. Computer graphic monitors are usually adjusted to approximately 9300 degrees K, which has a slightly bluish appearance when compared to a white sheet of paper. The second factor is the color temperature of the ambient lighting. Because of the subtracting nature of the printing process, the perceived color of an object on a print is strongly influenced by the spectral energy distribution of the light source under which the print is being viewed. The third factor is the spectral characteristic of the dyes used in the printing process, and is closely related to the ambient lighting as mentioned above. Different dyes can have different spectral absorption characteristics for different wavelengths. It is possible, for example, to have two cyan dyes which look identical under tungsten lighting (approximately 3200 degrees K), but look quite different under fluorescent lighting (approximately 5000 degrees).

The printer 14 has a built-in default color matrix having terms selected to compensate for one or more of a number of problems, including the cross-talk characteristics of the thermal printing dyes (that is, the overlapping spectral sensitivities of the dyes), dye transfer problems, phosphor characteristics and color temperature of the monitor, illuminant characteristics, and the like. (If such corrections are not made, the default matrix is a unity matrix.) Initially, these terms are accessed by the color matrix 48. If the foregoing compensation is still unacceptable, the saturation and hue adjustments of the color controls 34 in the calibration utility 22 can be used to further modify the print color. When the saturation and hue are accordingly adjusted and modification color matrix terms are generated by the printer color algorithm 30, the new terms are stored in a modification matrix memory 60 in the calibration utility 22. Meanwhile, the default terms are read from the color matrix 48 and written into a default matrix memory 62, also in the calibration utility 22. The modified terms and the default terms are multiplied in a matrix multiplication operation 64 and the resultant new matrix values are written into the color matrix 48 in the printer 14. The new terms in the color matrix 48 then become the old (default) terms for the matrix multiplication 64 as further color corrections are made. The printer color matrix 48 thus begins with the default matrix terms and, as corrections are made, is changed to contain the results of the matrix multiplication 64. The finally generated color matrix 48 accordingly modifies the image signal applied to the image calibration table 49.

For clarity of illustration, FIG. 1 is shown in terms of single look-up tables, that is, one tone scale LUT 44 in the utility 22 and one image calibration table 49 in the printer 14. In operation, since three colors (red, green, and blue) are being processed, three separate tables are maintained. Each of these tables, however, normally have the same values for each code value entry. On occasion, however, a close match from a tone reproduction standpoint can be obtained although neutral colors still have a slight color cast. In that situation, all the values of the tone scale and image calibration tables corresponding to the color cast are accordingly increased or decreased, and the color cast can be eliminated.

Figure 2A:
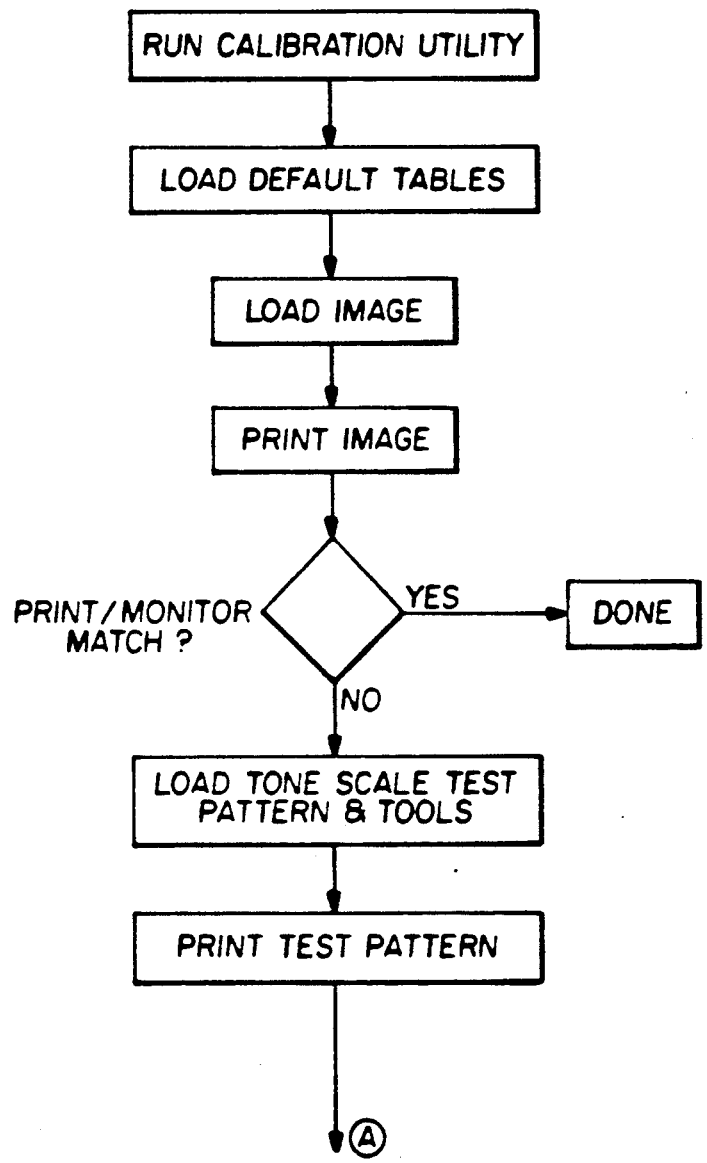
FIGS. 2A, 2B and 2C are diagrams of a general Procedure for implementing tone scale and color correction in accordance with the invention.
Figure 2B:
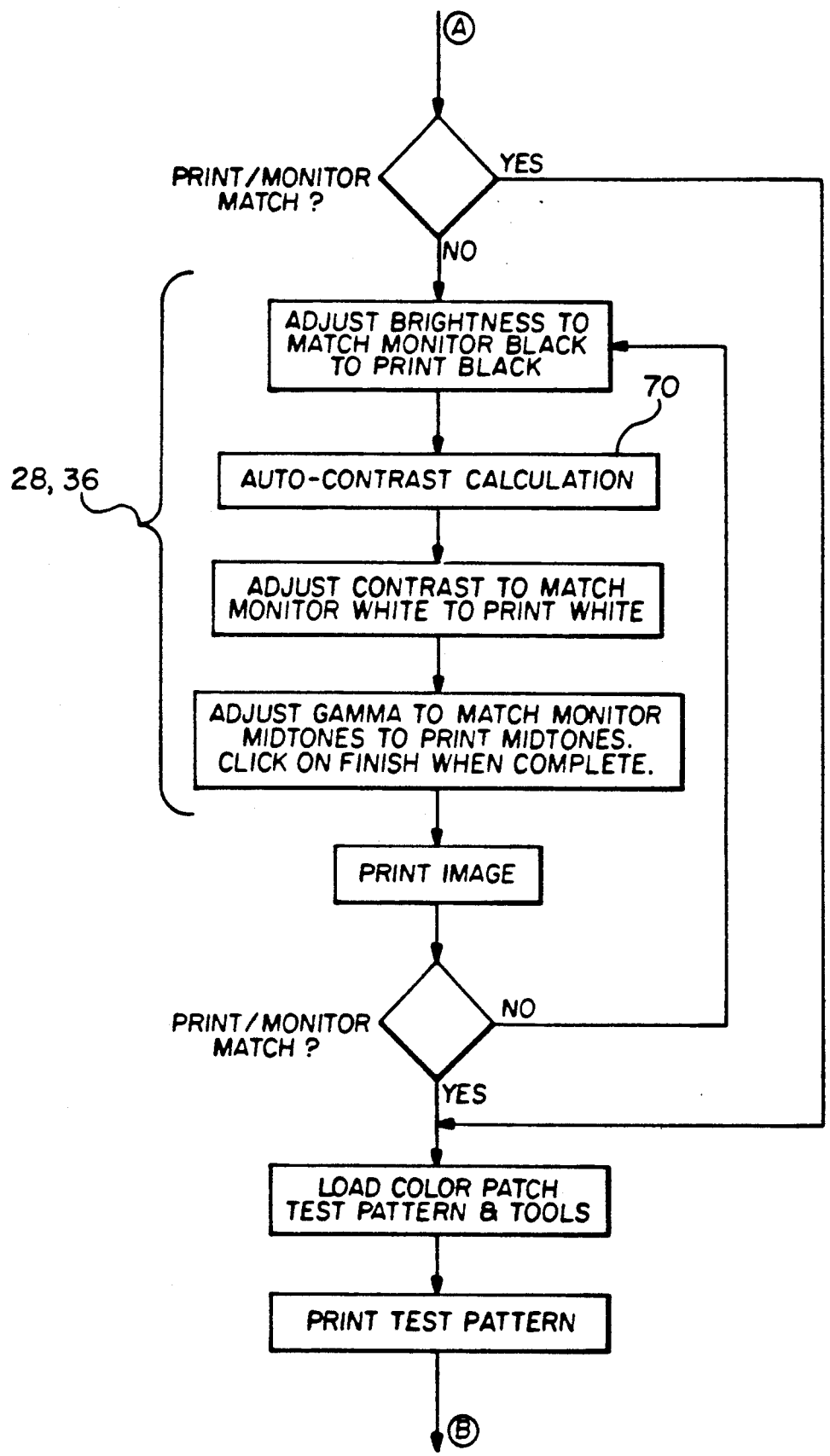
Figure 2C:
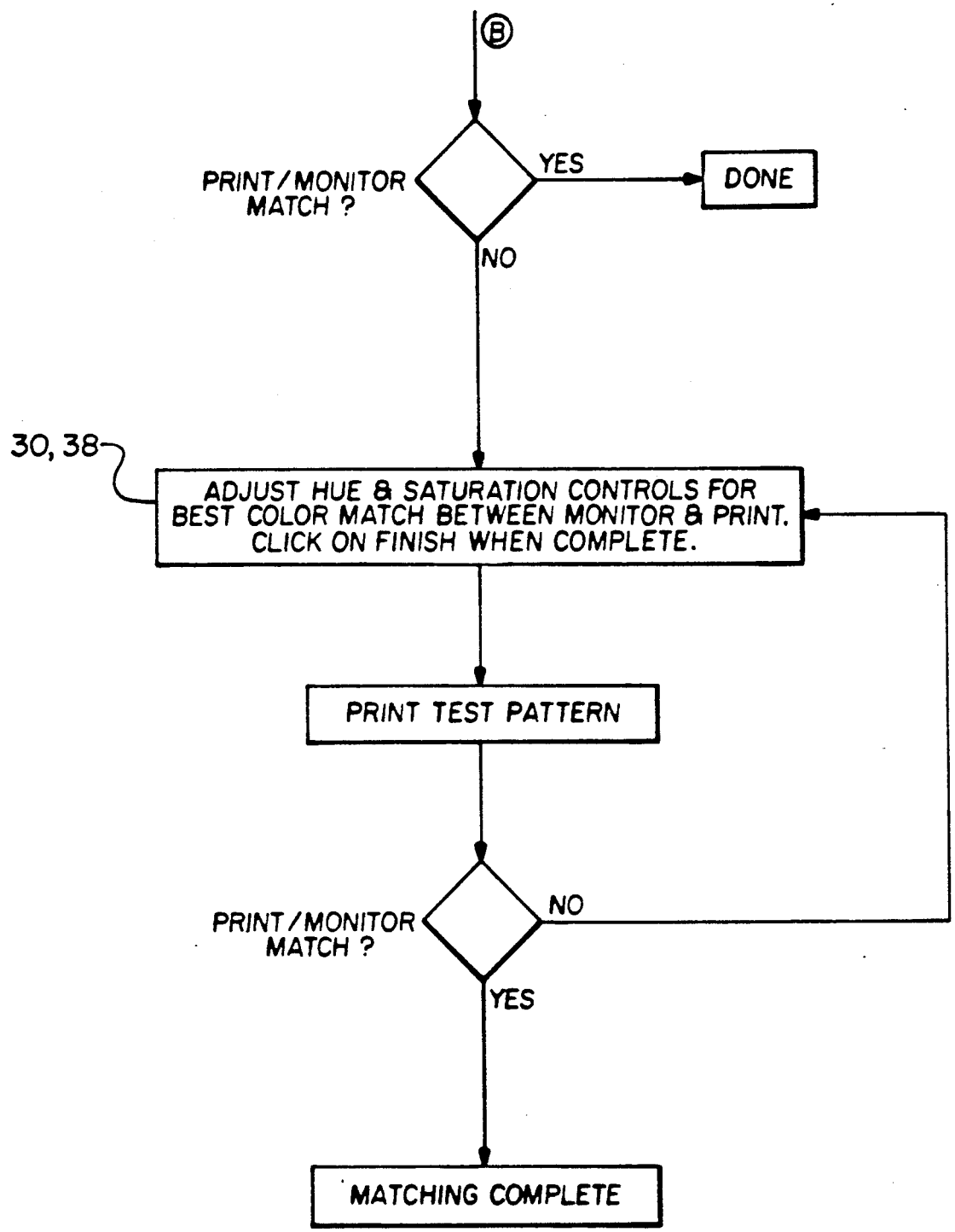

The general calibration procedure is outlined in FIGS. 2A-2C. Turning initially to tone scale correction, the user is provided with the ability to control tone scale by utilizing a visual matching technique that can independently control the shadow, mid-tone, and highlight regions as rendered by the printer image calibration table 49. This allows the operator the ability to "match" each gray level on the monitor to the corresponding gray patch on the print. In practice, the gray levels corresponding to the shadow, mid-tone, and highlight regions are individually adjusted to calibrate the print to the monitor.

The procedure of FIG. 2A assumes that an acceptable display on the monitor 18 has first been generated by the image processing application software 20. Furthermore, in the preferred embodiment, the tone scale algorithms 28 and 36 are implemented for the Kodak XL7700 printer and a MacIntosh display. Characterization of several MacIntosh display systems has yielded a good starting point for the image calibration table 49. The recommended starting or default values for tone scale are:

| Brightness = −20 | Contrast = 1.14 | Gamma = 1.80 |
|---|---|---|
| (Shadows) | (Highlights) | (Mid-tones) |

The calibration utility 22 is then run with the monitor default values for tone scale and color, that is, with the linear LUT 24 and the unity matrix 26. A print is then made and evaluated using the printer default values for tone scale and the color default values. If the print does not match the monitor, a tone scale test pattern (grey scale) is loaded into the input memory 19 and a print of the test pattern is made. Referring next to FIG. 2B, if the tone scale of the test print does not match the tone scale of the test pattern on the monitor, the printer and monitor tone scale algorithms 28 and 36 are enabled for each of the selected luminance levels.

The brightness part (B) of the tone scale control 32 is adjusted to set the shadow or black end of the displayed grey scale on the monitor to match the shadow or black end of the grey scale on the print. Making the brightness value more positive lightens the dark areas on the print, while making the brightness more negative will darken the print. After entering each new value for the brightness, the optimum contrast value is readjusted in an automatic contrast calculation 70 to obtain the maximum dynamic range on the print without clipping image detail near white. The contrast part (C) of the tone scale control 32 is next adjusted (if needed) to match the highlight area of the grey scale on the monitor to the highlight area of the grey scale on the print. Making the contrast number larger will lighten the highlights, while making it smaller will darken them. Finally, the gamma part (G) of the tone scale control 32 is adjusted to match the mid-tone area of the grey scale on the monitor to the corresponding mid-tone area of the grey scale on the print. Making the gamma number larger will darken the print, while making it smaller will lighten the print.

In effect, a perfectly acceptable monitor image has been adjusted to look "as bad as" the print. For each adjustment, the printer tone scale algorithm 28 generates correction terms for the image calibration table 49, while substantially inverted terms are generated by the monitor tone scale algorithm 36 for changing the monitor display 16 (via the tone scale LUT 44). Also with each adjustment, the monitor display 16 is brought closer to the print 10 while, in fact, the printer 14 is being calibrated for an inverse result closer to the original monitor image. The adjustments may have to go through several complete iterations of brightness, contrast, and gamma to reach an acceptable match between the monitor and the print, depending on how far apart the two images are to start with and how critical the evaluation is. When the adjustments are completed, the operator exits the tone scale algorithms, and the monitor image 16 reverts to its original value (that is, using the default terms in the linear LUT 24). The new tone scale terms are written to the image calibration table 49 in the printer 14. At this point a new print should be a close match to the monitor from a tone reproduction standpoint. If the print does not appear neutral (has a slight coloration to it), a value is added or subtracted to the entries in that particular color table (as described earlier, there are actually three image calibration tables, one each for red, green, and blue). The value may be a constant value added to each entry in the table. For example, entering a value of +5 red would add 5 to all of the entries in the red image calibration table, and would have the effect of making the print slightly redder throughout the tonal range, that is, from the dark areas to the highlights. Rather than being a constant, the value added to or subtracted from entries in the particular color table(s) may be proportional to density change. This allows adjustment of the color balance for the mid-tone neutrals without over-(or under-) correcting whites or blacks. For example, in order to maintain the same color shift throughout the entire tonal range, the entries can be proportionately changed from white to black, such that there is little or no change in the whites, gradually proceeding up to a maximum change in the blacks.

Once the user has achieved an acceptable tone scale match, a color match can be initiated. A color patch test pattern is displayed on the monitor 18, and the operator makes a print of the pattern. The operator then compares the resulting print 10 to the monitor display 16 and determines if an acceptable level of color matching exists. Referring now to FIG. 2C, if the match is not acceptable, the operator executes the printer and monitor color algorithms 30 and 38, using the color controls 34 to adjust the saturation and hue of the image. Using hue (H) and saturation (S) as input variables, the color algorithms calculate the matrix coefficients required to achieve the desired hue or saturation shift on the print. The hue is expressed in degrees and has a range of −90 degrees to +90 degrees. The saturation is expressed in percent and has a range of zero to 200 percent. The default values of hue and saturation (which produce no change in the print) for the Kodak XL7700 printer and a MacIntosh display are:

| Hue = 0 degrees | Saturation = 100% |
|---|---|

As with tone scale, the operator adjusts the color controls to make the monitor look as close to, i.e., "as bad as", the print as possible. For each adjustment, the printer color algorithm 30 generates matrix terms for the modification matrix 60, while substantially inverted terms are generated by the monitor color algorithm 38 for changing the monitor display (via the color matrix 46). As with tone scale correction, each adjustment brings the monitor closer to the print 10 while, simultaneously, the printer 14 is being calibrated for an inverted result closer to the original monitor image. When the operator is satisfied with the match, the color matching process is completed and the monitor image reverts to its original value (using the unity matrix 26). New matrix values (default 62 multiplied by modification matrix 60) are then sent to printer matrix 48.

At this point, the printer tone scale algorithm 28 and the printer color algorithm 30 have calculated the printer parameters required to make the printer 14 respond inversely to what was done to the monitor image, and the result is a print that is a closer tone scale and color match to the monitor image. Clearly, however, it is inconsequential as to whether the printer responds inversely to monitor adjustments, or whether the monitor responds inversely to printer adjustments, for the result is the same. It is believed to be important, however, that the tone scale adjustments be completed in the order illustrated in FIG. 2B, that is, brightness first, contrast second, and gamma last. The order of hue and saturation appears to be of less importance, although it is preferred to do saturation first.

The following sections pertain further to the use of the calibration method of the invention with the color printer, Model XL7700, manufactured by Eastman Kodak Company. Other printers, whether manufactured by Eastman Kodak Company or by another manufacturer, and whether operating by a thermal principle or some other printing principle, would require modifications in the printer and monitor equations, and in the default values. However, the concepts remain the same and implementation for other printers is within the capability of one of ordinary skill in this art.

Equations for Print to Monitor Matching

Set forth below are sets of equations constituting the printer and monitor tone scale algorithms 28 and 36 for calculating printer and monitor look-up tables, respectively, using brightness, contrast, and gamma as the input variables. Also included are sets of equations constituting the printer color algorithm 30 for calculating printer color matrix terms using saturation and hue as the input variables. In all cases, table values are calculated for 8 bit input code (image) values, that is, one table entry for each of 256 code values. The equations are broken into several steps, including definitions, for purposes of clarity.

| Definitions: | |
|---|---|
| B = Brightness | R = Reflectance |
| C = Contrast | D = Density |
| G = Gamma | CV = Code Value |
| S = Saturation | H = Hue in degrees |
| $O_c$ = Offset value from Red, Green, Blue sliders | |
| ALUT = Absolute LUT | RLUT = Relative LUT |
| T = Transmittance | $T_d$ = Default Monitor Transmittance |
| $C_{auto}$ = Auto Contrast | MLUT = Monitor LUT |
| X = Contrast Factor | $R_{255}$ = Reflectance for |

| | CV = 255 |
|---|---|
| * = Multiplication | / = Division |
| ∧ = Exponentiation | LOG(x) = Log(base 10) of x |

IF[condition,x,y] = IF condition is TRUE then x, if FALSE then y

Printer Equations (for printer tone scale algorithm 28):

R = IF[(CV + 1 + B) < 0,0.003162,IF[B < 0,(((( CV + 1 + B)/256)∧(0.9*G))*C + 0.003162 − (1/256)∧(0.9*G)),((CV + 1)/256∧(0.9*G)*C + 0.003162 − (1/256)∧(0.9*G)]]
D = IF[R < 0.003162,2.5,LOG(1/R)]
ALUT = IF[(D/2.5*255) < 0,0,IF[B < 0,D/2.5*255,D/2.5 *255 − B]]
RLUT = IF[ALUT > 255,0,IF[ALUT < 0,255,255 − ALUT]]

The equations above will compute values (RLUT) for the printer calibration table 49 that have minimum interaction between the controls 32. The look-up table will have a common starting point for any value of brightness offset regardless of contrast or gamma. Similarly, the end point is unaffected by gamma.

Monitor Equations (for monitor tone scale algorithm 36):

T = IF[(CV + 1 + B) < 0, −1*(ABS(((CV + 1 + B)/256))∧(0.9*G)*C + 0.003162 − (1/256)∧(0.9*G)),((CV + 1 + B)/256∧ (0.9*G)*C + 0.003162 − (1/256)∧(0.9*G)]]
MLUT = IF[CV + ($T_d$ − T)*255 − $O_c$ > 255,255,IF[CV + ($T_d$ − T)*255 − $O_c$ < 0,0,CV + ($T_d$ − T)*255 − $O_c$]]

The monitor LUT (MLUT) values are based on a table 37 (FIG. 1) of default transmittance values $T_d$). Initially, the default transmittance table 37 is calculated for each code value according to the monitor equations for a set of default tone scale values, in particular, brightness (B) = −20, gamma (G) = 1.80, and contrast (C) = 1.14. These are the starting values, and the resulting table is denoted as $T_d$. If the brightness, gamma, and/or contrast controls 32 are then adjusted, a set of monitor LUT (MLUT) values are calculated, using the default transmittance table values ($T_d$). The equations above will compute a monitor look-up table that will cause the monitor to change brightness in the opposite direction to that of the print. This is used, as explained hereinbefore, to give the user visual feedback while doing the tone-scale matching. If a further iteration of tone scale is required, a new set of default values are calculated, using the previous transmittance values as the new default monitor transmittance table ($T_d$), that is, using the previous B, G, and C values (of the last iteration).

Auto Contrast (for the automatic contrast calculation 70)

The auto-contrast routine 70 (FIG. 2B) calculates the optimum contrast (C) value to obtain the maximum dynamic range on the print without clipping image detail near white. For example, if the brightness is raised to +20 (making the dark areas lighter), the table values would flatten out or clip near the white end (code values near 255). The auto-contrast routine will calculate a contrast value that will cause the maximum table to just reach 255 without clipping.

Whenever the brightness value is changed, the contrast value is checked to ensure that the white (255) end of the printer LUT curve reaches a maximum of 255 without being clipped. The equations to automatically calculate the optimum contrast value are as follows.

$$X = IF[B<0, 1, 1/\log^{-1}(B*2.5/255)]$$

$$C_{auto} = X/R_{255} * C$$

The procedure is used in calculation of the printer tone scale algorithm 28 using the new brightness value and old contrast value. Then, X and $C_{auto}$ are calculated, and the tone scale algorithm 28 is recalculated using $C_{auto}$ in place of the old contrast value.

Color Matching

Color matching is performed using hue (H) and saturation (S) controls 34. The operator-supplied H & S values define the modification matrix 60 which is used to modify (by matrix multiplication 64) the existing color matrix coefficients that reside in the color matrix 48. The newly calculated matrix coefficients (new = old × modifier) are then downloaded to the color matrix 48 in the printer 14 to be used for subsequent prints. The same H & S values are applied to the monitor color algorithm 38, which generates corresponding, but inverted, changes in the monitor image. The matrix equations are as follows:

Modification Matrix Equations (for the printer color algorithm 30):

$a_{11} = .299 + (100/S)*(.701\text{Cos}(-H) - .168\text{Sin}(-H))$
$a_{12} = .587 - (100/S)*(.587\text{Cos}(-H) + .330\text{Sin}(-H))$
$a_{13} = .114 - (100/S)*(.114\text{Cos}(-H) - .498\text{Sin}(-H))$
$a_{21} = .299 + (100/S)*(.328\text{Sin}(-H) - .299\text{Cos}(-H))$
$a_{22} = .587 + (100/S)*(.413\text{Cos}(-H) - .035\text{Sin}(-H))$
$a_{23} = .114 - (100/S)*(.114\text{Cos}(-H) + .292\text{Sin}(-H))$
$a_{31} = .299 - (100/S)*(1.248\text{Sin}(-H) + .299\text{Cos}(-H))$
$a_{32} = .587 + (100/S)*(1.045\text{Sin}(-H) - .587\text{Cos}(-H))$
$a_{33} = .114 + (100/S)*(.203\text{Sin}(-H) + .886\text{Cos}(-H))$ Monitor Equations (for monitor color algorithm 38)

$a_{11} = .299 + (.01S)*(.701\text{Cos}(H) - .168\text{Sin}(H))$
$a_{12} = .587 - (.01S)*(.587\text{Cos}(H) + .330\text{Sin}(H))$
$a_{13} = .114 - (.01S)*(.114\text{Cos}(H) - .498\text{Sin}(H))$
$a_{21} = .299 + (.01S)*(.328\text{Sin}(H) - .299\text{Cos}(H))$
$a_{22} = .587 + (.01S)*(.413\text{Cos}(H) - .035\text{Sin}(H))$
$a_{23} = .114 - (.01S)*(.114\text{Cos}(H) + .292\text{Sin}(H))$
$a_{31} = .299 - (.01S)*(1.248\text{Sin}(H) + .299\text{Cos}(H))$
$a_{32} = .587 + (.01S)*(1.045\text{Sin}(H) - .587\text{Cos}(H))$
$a_{33} = .114 + (.01S)*(.203\text{Sin}(H) + .886\text{Cos}(H))$ The calibration utility according to the preferred embodiment is designed for utilization with a MacIntosh computer and display system, which has an inherent monitor color algorithm that uses hue and saturation values to modify the color reproduction of the monitor image. Therefore, in this embodiment, the inverse versions of the hue and saturation changes provided by the color controls 34 are input directly to the MacIntosh system. This is shown schematically in FIG. 1 by a line 38a originating from the monitor color algorithm 38, which in this embodiment merely inverts the hue and saturation values (instead of applying the above monitor equations) and applies the inverse values to the computer system, bypassing the color matrix 46. For example, if the saturation in one color is changed by the printer color algorithm 30 from 100% to 120%, a value of 1/1.2 is applied as a multiplier to the previous monitor saturation value, and a hue change in one color of +5° is applied to the monitor as a modifier of -5°. In both cases, the MacIntosh system uses the inverse values as input variables to its own color reproduction software, and the monitor image is changed accordingly. Where it is not desirable to utilize the host computer's color reproduction algorithm, the inverse hue and saturation matrix terms are calculated by the monitor color algorithm 38 as hereinbefore illustrated and applied to the color matrix 46.

While FIG. 1 is shown as a block diagram, the preferred embodiment will have most blocks implemented in software and the resultant processing completed by a programmed computer (particularly in the case of the calibration utility 22) or by an internal digital processor (in some embodiments of the printer 14).

The invention has been described in detail with particular reference to a presently preferred embodiment, but it will be understood that variations and modifications can be effected within the spirit and scope of the invention.

What is claimed is:

1. Apparatus for calibrating an electronic output system of a color printer so that after calibration is obtained a print generated by the printer closely resembles an image of the print obtained on a video monitor, said apparatus comprising:
    printer calibration means for adjusting at least one of the tone scale and the color reproduction of said printer;
    display calibration means for adjusting said at least one of the tone scale and the color reproduction of said monitor;
    means interactive with an operator during calibration for commonly controlling said printer and display calibration means and generating an adjustment of said monitor that is substantially the inverse of an adjustment of said printer, wherein a print initially generated by said printer has unacceptable tone scale and/or color reproduction and said interactive means causes said display calibration means to produce display calibration values that, for the purpose of calibrating the output system, drive the image on the monitor to look as unacceptable as the print, while simultaneously causing said printer calibration means to produce substantially complementary, but inverted, printer calibration values for generating an optimal print.

2. Apparatus as claimed in claim 1 wherein said calibration means for adjusting the tone scale of said printer and said monitor adjusts at least one of the brightness, contrast, and gamma of the image.

3. Apparatus as claimed in claim 1 wherein said calibration means for adjusting the color reproduction of said printer and said monitor adjusts at least one of the saturation and hue of the image.

4. Apparatus as claimed in claim 1 wherein said color printer includes means for printing the image with said printer calibration values applied to the printer, thereby generating an optimal print.

5. Apparatus as claimed in claim 1 wherein said interactive means includes operator controls for varying tone scale and/or color of the monitor image.

6. Apparatus as claimed in claim 5 wherein said printer calibration means includes a printer tone scale look up table and a printer color matrix, said printer calibration values being produced for said printer table and printer matrix in response to changes in said operator controls.

7. Apparatus as claimed in claim 6 wherein said display calibration means includes a monitor tone scale look up table and a monitor color matrix, said display calibration values being produced for said monitor table and monitor matrix in response to changes in said operator controls.

8. A system for caliburating a color printer so that a final print obtained from electronic image data closely resembles an image on a color monitor generated from the same image date, said system comprising:
   means for generating an initial test print from the electronic image data;
   means for commonly adjusting at least one of the tone scale and color reproduction for both the monitor and the printer according to complementary algorithms that produce tone scale and color modifications for the monitor that are substantially the inverse of the complementary tone scale and color modifications produced for the printer; and
   correcting means in the printer for storing tone scale and color modifications that, when applied to the monitor as inverted complementary modifications, produce an image on the monitor that substantially resembles the test print.

9. A method for calibrating an electronic output system of a color printer so that a final print closely resembles an image of the print obtained on a video monitor, said method comprising the steps of:
   generating an acceptable image on the monitor from a stored image;
   printing the stored image to obtain a hard copy print;
   comparing the hard copy print to the monitor image for tone scale reproduction;
   adjusting the tone scale reproduction of the monitor and printer in a complementary, but substantially inverse, manner until the tone scale of the monitor image substantially resembles the tone scale of the hard copy image;
   comparing the hard copy print to the tone-scale adjusted monitor image for color reproduction; and
   adjusting the color reproduction of the monitor and printer in a complementary, but substantially inverse, manner until the color reproduction of the monitor image substantially resembles the color reproduction of the hard copy image.

10. Method as claimed in claim 9 wherein the steps of comparing and adjusting the tone scale reproduction comprise:
    comparing the hard copy print to the monitor image for dark, or shadow, tone scale reproduction;
    adjusting the dark, or shadow, tone scale reproduction of the monitor and printer in a complementary, but substantially inverse, manner until the dark or shadow areas of the monitor image substantially correspond to the dark, or shadow, areas of the hard copy image; and
    repeating the above steps of comparing and adjusting for the white, or highlight areas, and then for the mid-tone areas of the monitor and hard copy images.

11. Method as claimed in claim 9, wherein the steps of comparing and adjusting the color reproduction comprise:
    comparing the hue of the hard copy print to the hue of the monitor image;
    adjusting the hue reproduction of the monitor and printer in a complementary, but substantially inverse, manner until the hue of the monitor image substantially matches the hue of the hard copy image; and
    repeating the above steps of comparing and adjusting for the saturation of colors of the monitor and hard copy images.

12. Method as claimed in claim 9 wherein the step of printing the stored image obtains a hard copy that is unacceptable as to tone scale and/or color reproduction and the steps of adjusting the tone scale and color reproduction drive the monitor image to look as unacceptable as the hard copy image.

13. Method as claimed in claim 12, further comprising the steps of
    resetting the tone scale and/or color reproduction of the monitor to generate the acceptable image on the monitor; and
    printing the stored image with the tone scale and/or color reproduction adjustments applied to the printer, whereby the hard copy print is now acceptable.

14. A method for calibrating and subsequently operating an electronic output system of a color printer so that a final print closely resembles an image of the print obtained on a video monitor, said method comprising the steps of:
    generating an acceptable image on the monitor from a stored image;
    printing the stored image to obtain a hard copy print having unacceptable tone scale and/or color reproduction;
    comparing the hard copy print to the monitor image for said tone scale and/or color reproduction;
    adjusting said tone scale and/or color reproduction of the monitor and printer in a complementary, but substantially inverse manner until the monitor image is driven to look as unacceptable as the hard copy print;
    resetting the monitor to again generate an acceptable image; and
    printing the stored image according to said adjusted tone scale and/or color reproduction to obtain a hard copy print having acceptable tone scale and/or color reproduction.

15. A system as claimed in claim 14 in which the initial test print is less than optimal, the monitor image produced during calibration by adjusting the tone scale and color reproduction of the monitor is likewise less than optimal, and wherein said complementary tone scale and color modifications for use by the printer produce an optimal print.

* * * * *